(12) United States Patent
Feria et al.

(10) Patent No.: US 7,245,599 B2
(45) Date of Patent: Jul. 17, 2007

(54) APPLICATION OF COMPLEX CODES TO MAXIMIZE USER LINK UTILIZATION

(75) Inventors: Ying J. Feria, Manhattan Beach, CA (US); Donald C. D. Chang, Thousand Oaks, CA (US); Ming U. Chang, Palos Verdes, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 939 days.

(21) Appl. No.: 09/945,483

(22) Filed: Aug. 31, 2001

(65) Prior Publication Data

US 2002/0150067 A1    Oct. 17, 2002

Related U.S. Application Data

(60) Provisional application No. 60/266,815, filed on Feb. 5, 2001.

(51) Int. Cl.
*H04B 7/216* (2006.01)
(52) U.S. Cl. .................... 370/335; 370/441
(58) Field of Classification Search ............ 375/240.23
See application file for complete search history.

(56) References Cited

U.S. PATENT DOCUMENTS

| 5,726,658 | A | | 3/1998 | Auslander | 342/204 |
|---|---|---|---|---|---|
| 6,091,760 | A | * | 7/2000 | Giallorenzi et al. | 375/140 |
| 6,563,808 | B1 | * | 5/2003 | Cox et al. | 370/335 |
| 6,665,332 | B1 | * | 12/2003 | Carlson et al. | 375/130 |
| 6,707,788 | B1 | * | 3/2004 | Kim et al. | 370/203 |
| 6,728,202 | B1 | * | 4/2004 | Sayeed et al. | 370/208 |
| 6,741,550 | B1 | * | 5/2004 | Shin | 370/209 |
| 2002/0146058 | A1 | * | 10/2002 | Feria et al. | 375/130 |
| 2002/0172181 | A1 | * | 11/2002 | Sayeed | 370/342 |
| 2005/0013240 | A1 | * | 1/2005 | Gerakoulis et al. | 370/208 |

\* cited by examiner

*Primary Examiner*—Chi Pham
*Assistant Examiner*—Anh-Vu Ly
(74) *Attorney, Agent, or Firm*—Georgann S. Grunebach

(57) ABSTRACT

A method of increasing utilization of user link bandwidth for a code division multiple access communications system is disclosed that includes the steps of selecting a set of orthogonal complex codes each having a code length that is greater than a code length of an optimum real code and less than or equal to a spreading code length; and transferring symbols across at least one of a plurality of user links to or from at least one of a corresponding plurality of user terminals wherein the symbols are represented by a corresponding one of the set of orthogonal complex codes.

9 Claims, 3 Drawing Sheets

FIG. 2

APPLICATION OF COMPLEX CODES TO MAXIMIZE USER LINK UTILIZATION

This application claims the benefit under 35 U.S.C. § 119(e) of U.S. provisional application 60/266,815, filed Feb. 5, 2001, for "APPLICATION OF COMPLEX CDMA CODES FOR MAXIMIZE FEEDER LINK UTILIZATION" inventor Ying J. Feria, et al., the entire contents of which are incorporated herein by this reference.

BACKGROUND OF THE INVENTION

The present invention relates generally to code division multiple access (CDMA) cellular communications systems. More specifically, but without limitation thereto, the present invention relates to assigning variable length codes to service a maximum number of users in a code division multiple access service area that is assigned a fixed frequency band.

The radio frequency spectrum is limited almost everywhere in the world and is generally licensed in fixed frequency bands. Code division multiple access (CDMA) cellular communications systems typically use a set of CDMA codes that are orthogonal to one another to avoid mutual interference. The term orthogonal is applied to a set of codes if the vector dot product of any code in the set with any other code in the set results in zero. For example, the code (−1, −1) is orthogonal to the code (−1, 1) since −1*−1+−1*1=0. Currently known orthogonal CDMA codes have a code length of $2^n$, where n is a positive integer. The available frequency bands are not necessarily integrally divisible by $2^n$, however. For example, for a user link that has 5 MHz of available bandwidth, the coded bit rate is 144 kbps (kilobits per second). If quadrature phase shift keying (QPSK) modulation is used, then the maximum ratio of bandwidth to symbol rate, or spreading code length, would be 68. However, no orthogonal codes are available having a code length of 68. The closest power of two that is less than 68 is 64. About six percent of the available bandwidth is therefore unusable using conventional CDMA codes. In other cases, there may be a substantially higher percentage of unused bandwidth due to the limited code lengths available using conventional CDMA codes. The unused bandwidth represents a loss of revenue from potential CDMA subscribers that might otherwise be included in the same service area.

SUMMARY OF THE INVENTION

The present invention advantageously addresses the problems above as well as other problems by providing a method of increasing utilization of user link bandwidth for a code division multiple access communications system.

In one embodiment, the present invention may be characterized a method of increasing utilization of user link bandwidth for a code division multiple access communications system that includes the steps of selecting a set of orthogonal complex codes each having a code length that is greater than a code length of an optimum real code and less than or equal to a spreading code length; and transferring symbols across at least one of a plurality of user links to or from at least one of a corresponding plurality of user terminals wherein the symbols are represented by a corresponding one of the set of orthogonal complex codes.

In another embodiment, the present invention may be characterized as a code division multiple access communications system that includes a base station; a geo-stationary platform; a feeder link coupled to the base station and the geo-stationary platform for transferring symbols between the base station and the geo-stationary platform; a plurality of user terminals; and a plurality of user links coupled respectively to the plurality of user terminals and to the geo-stationary platform for transferring symbols between the geo-stationary platform and at least one of the plurality of user terminals wherein the symbols are represented by at a corresponding one of a set of orthogonal complex codes having a code length that is greater than a code length of an optimum real code and less than or equal to a spreading code length.

BRIEF DESCRIPTION OF THE DRAWINGS

The features and advantages of the present invention may be apprehended from the following description thereof, presented in conjunction with the following drawings wherein:

FIG. 2 is an exemplary set of orthogonal complex codes for maximizing the user length bandwidth of the code division multiple access communication system of FIG. 1 according to an embodiment of the present invention.

Corresponding reference characters indicate corresponding elements throughout the several views of the drawings.

DESCRIPTION OF THE EMBODIMENTS

Figure 1:
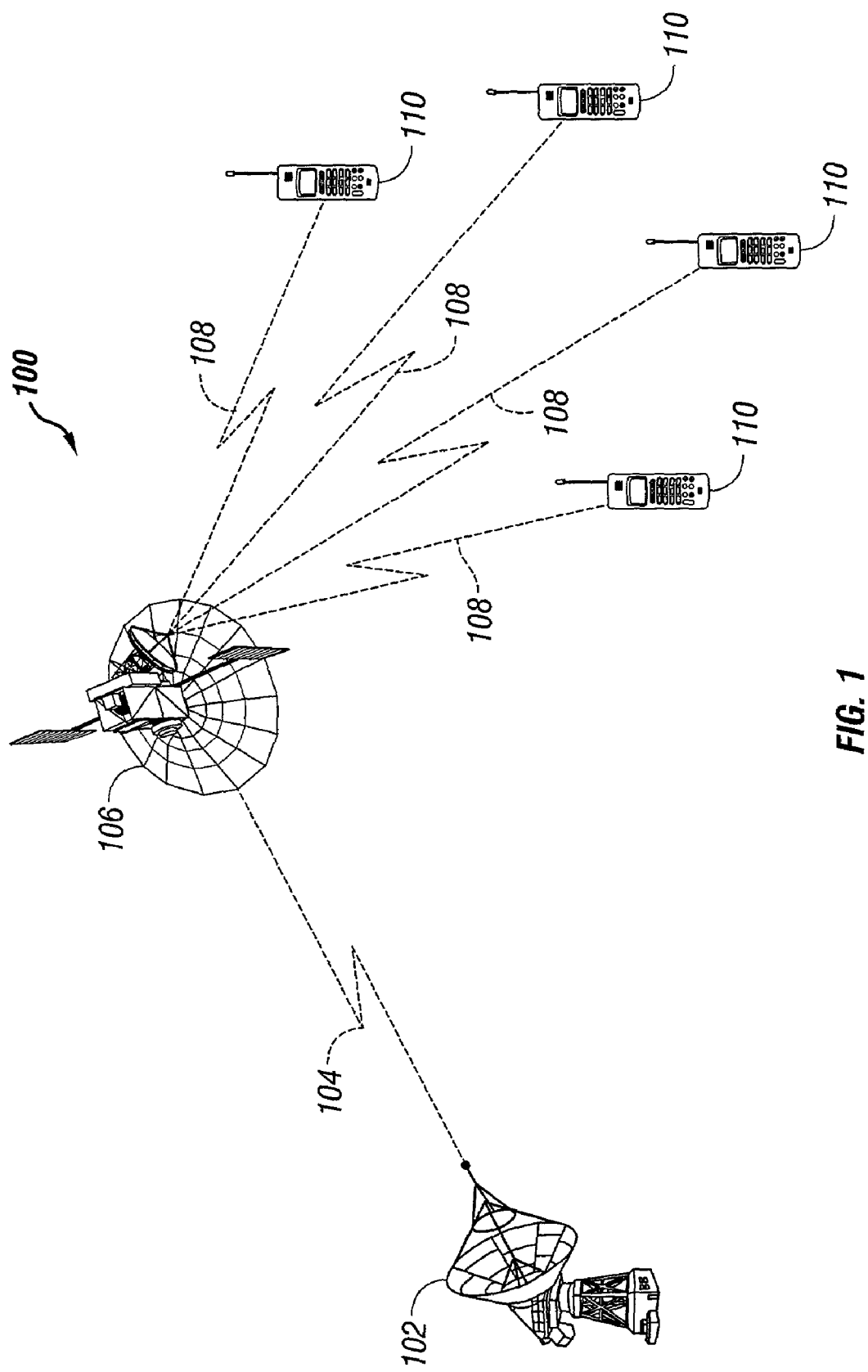
FIG. 1 is a diagram of a code division multiple access (CDMA) communications system of the prior art.

FIG. 1 is a diagram of a typical code division multiple access (CDMA) communications system 100. Shown in FIG. 1 are a base station 102, a feeder link 104, a geo-stationary platform 106, user links 108, and user terminals 110.

The base station 102 transmits and receives symbols between user terminals 110 across the feeder link 104. The feeder link 104 is an RF communications link between the base station 102 and the geo-stationary platform 106. The geo-stationary platform 106 is typically a geo-stationary satellite, however other platforms having a relatively fixed position with respect to the base station 102 may also be used according to techniques well known in the art. Because the feeder link 104 is between only two points (point-to-point), code division multiple access communications between the base station 102 and the geo-stationary satellite 106 are generally synchronous, and may be modulated by, for example, quadrature phase shift keying (QPSK).

The user terminals 110, may be, for example, cellular telephones. The user links 108 are RF communications links between the respective user terminals 110 and the geo-stationary satellite 106. Because the user links 108 are between multiple points whose positions relative to the geo-stationary satellite 106 may change (point-to-multiple-point), communications between the user terminals 110 and the geo-stationary satellite 106 are generally asynchronous, and may be modulated, for example, by quadrature phase shift keying (QPSK).

To avoid mutual interference, code division multiple access (CDMA) communications systems generally use mutually orthogonal codes for transferring symbols across the user links 108. One example of mutually orthogonal codes is a set of Walsh codes. Walsh codes may be generated from Walsh code functions as follows. To generate a Walsh code sequence of code length two starting from a seed value of −1 for a Walsh code of code length one, the seed value of −1 is appended to itself to generate the first Walsh code, (−1,−1). The bit-inverse of the seed value is appended to the seed value to generate the second Walsh code, (−1,1). This is the equivalent of creating the 2-bit Walsh code table shown in Table 1 below.

TABLE 1

| Walsh Code | W0 | W1 |
|---|---|---|
| 0 | −1 | −1 |
| 1 | −1 | 1 |

The procedure used to create Table 1 may be repeated to generate the Walsh codes for the next higher order, i.e., the next longer Walsh code length, as shown in Table 2 below. The 2×2 matrix in bit positions W0 and W1, also called the Hadamard transform matrix, is appended to itself in bit positions W2 and W3 to generate the first two Walsh codes 0 and 1. The second two Walsh codes 2 and 3 are generated by appending the bit-inverse of the 2×2 matrix to the original 2×2 matrix.

TABLE 2

| Walsh Code | W0 | W1 | W2 | W3 |
|---|---|---|---|---|
| 0 | −1 | −1 | −1 | −1 |
| 1 | −1 | 1 | −1 | 1 |
| 2 | −1 | −1 | 1 | 1 |
| 3 | −1 | 1 | 1 | −1 |

Additional Walsh code tables for the higher order Walsh code lengths may be generated by repeating the procedure above. For example, to create eight-bit Walsh codes, the 4×4 matrix of Table 2 is replicated three times and inverted in the lower right hand quadrant as shown in Table 3 below.

TABLE 3

| Walsh Code | W0 | W1 | W2 | W3 | W4 | W5 | W6 | W7 |
|---|---|---|---|---|---|---|---|---|
| 0 | −1 | −1 | −1 | −1 | −1 | −1 | −1 | −1 |
| 1 | −1 | 1 | −1 | 1 | −1 | 1 | −1 | 1 |
| 2 | −1 | −1 | 1 | 1 | −1 | −1 | 1 | 1 |
| 3 | −1 | 1 | 1 | −1 | −1 | 1 | 1 | −1 |
| 4 | −1 | −1 | −1 | −1 | 1 | 1 | 1 | 1 |
| 5 | −1 | 1 | −1 | 1 | 1 | −1 | 1 | −1 |
| 6 | −1 | −1 | 1 | 1 | 1 | 1 | −1 | −1 |
| 7 | −1 | 1 | 1 | −1 | 1 | −1 | −1 | 1 |

Each Walsh code has a code length of $2^n$ bits, where n is a power of 2. In quadrature phase shift keying modulation, a Walsh code is represented by modulating the RF carrier phase between −90 degrees for a −1 and +90 degrees for a 1. Because −90 degrees and +90 degrees lie on the real axis of a phase vector coordinate system, the corresponding codes are called real codes.

In a code division multiple access system wherein orthogonal codes are generated by Walsh functions, the user data rate may be variable. For example, for a set of orthogonal Walsh codes having a code length of eight and a basic data rate of R, a code division multiple access system can support the following scenarios:

(1) all eight users with a data rate of R, (2) one user with a data rate of 2R and 4 users with a data rate of R, (3) one user with a data rate of 4R and 2 users with a data rate of R, and (4) one user with a data rate of 8R. In this case, the entire bandwidth is dedicated to a single user.

Other scenarios such as those described above may be used to show that the number of available data rates for a given code length is half the code length. In the example above, there are four data rates (R, 2R, 4R, and 8R).

By introducing additional phase values for modulating the phase of the RF carrier, a set of orthogonal complex codes to represent symbols transferred across the user links 108 may be selected. Each of the orthogonal complex codes has a selected code length other than $2^n$. for example, a selected orthogonal complex code may have a code length of 4n. Because there are more values of 4n in a given numerical interval than there are values of $2^n$, a set of orthogonal complex codes may be selected to utilize a greater portion of a fixed bandwidth than may be possible with the optimum set of real codes having a code length equal to the closest value of $2^n$ that does not exceed the spreading code length.

By way of example, a set of orthogonal complex codes of code length 4n to represent symbols transferred across the user links 108 may be generated from the following Kronecker tensor product:

$$C_{L \times P} = A_L \otimes W_P \quad (1)$$

wherein $C_{L \times P}$ is a matrix of complex codes each having a code length equal to L×P, L is a positive integer, P equals $2^n$ and n equals a positive integer, $W_P$ is a Walsh code of code length P, $A_L$ is a coefficient matrix of elements $a_{jk}$, where j=1 . . . L, k=1 . . . L, and $$a_{jk} = e^{j2\pi(j-1)(k-1)/L} \quad (2)$$

The optimum Walsh code rate is the highest power of two that is less than or equal to the ratio of bandwidth to symbol rate, or spreading code length. For example, the optimum Walsh code length for a spreading code length of 12 is $2^3$, since the next higher Walsh code length of $2^4$ exceeds the spreading code length. Because orthogonal complex codes generated, for example, by formula (1) may have a code length of 4n, a set of orthogonal complex codes having a code length greater than the optimum Walsh code length may be generated to fully utilize a spreading code length of 12. For a spreading code length of 12, the following mixture of data rates is possible:

(1) all 12 users with a data rate of R, (2) one user with a data rate of 3R and nine users with a data rate of R, (3) one user with a data rate of 6R and six users with a data rate of R, and (4) one user with a data rate of 12R. In this case, the entire bandwidth is dedicated to a single user.

By way of example, to generate a set of complex codes of code length 12 using formula (1), let L=3 and P=4. The complex CDMA code is then given by the following relation:

$$C_{3 \times 4} = \begin{bmatrix} a_{11}W_4 & a_{12}W_4 & a_{13}W_4 \\ a_{21}W_4 & a_{22}W_4 & a_{23}W_4 \\ a_{31}W_4 & a_{32}W_4 & a_{33}W_4 \end{bmatrix} \quad (3)$$

Figure 2:
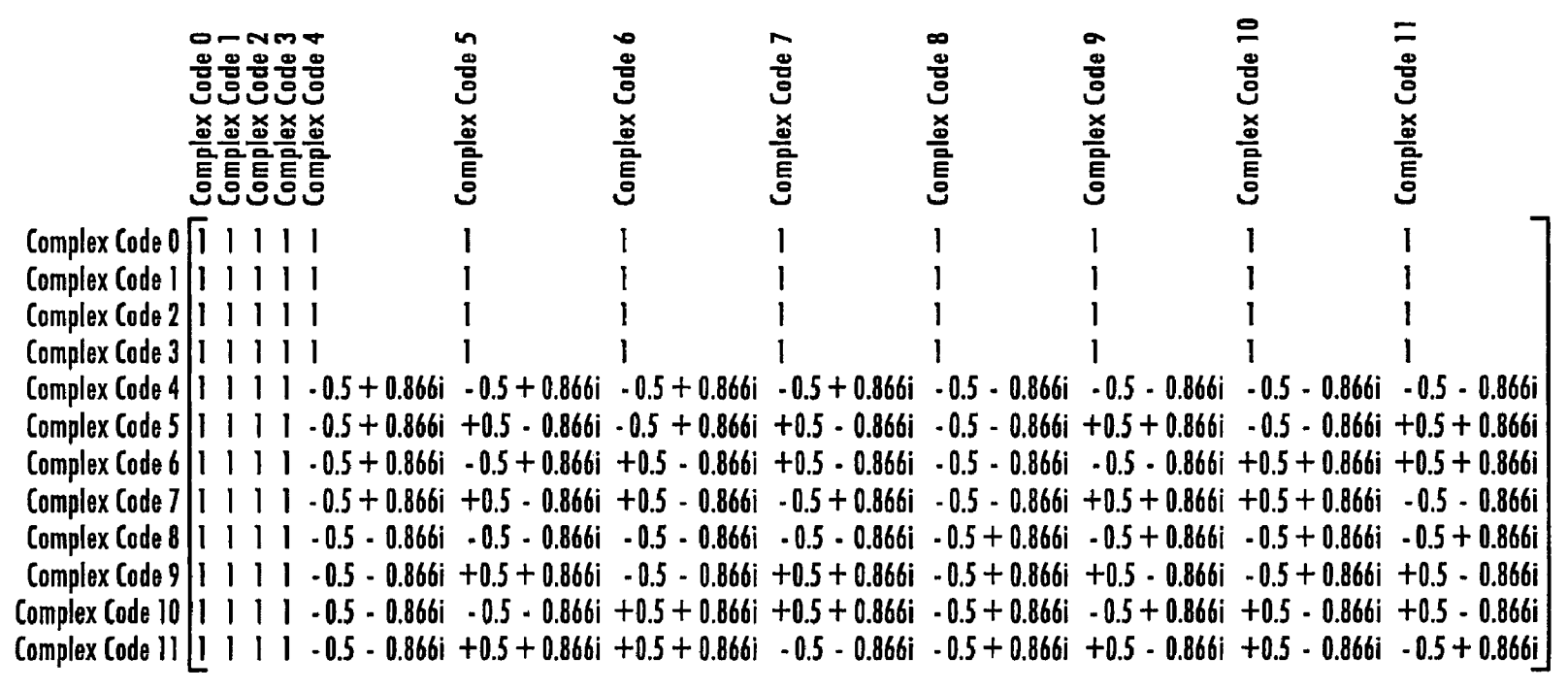

Numerically, $C_{3 \times 4}$ equals the matrix of orthogonal complex codes illustrated in FIG. 2. Each column and corresponding row of the matrix of orthogonal complex codes illustrated in FIG. 2 is a complex code that is orthogonal to each of the other complex codes.

For the example of a given bandwidth of 5 MHz and a given bit rate of 144 kbps described above, the bandwidth utilization of the user link in the code division multiple access communication system 100 may be improved from 64/68=94 percent for the optimum set of real codes to 68/68=100 percent by implementing a set of orthogonal complex codes such as those generated in the example above as well as other sets of orthogonal complex codes that may be generated for specific applications. The increase in bandwidth utilization is generally available in those cases where a set of orthogonal complex codes may be generated having a code length that is greater than the optimum real code length and less than or equal to the corresponding spreading code length for a given user link bandwidth and a given data bit rate. The greater code length of the selected set of orthogonal complex codes allows more user terminals 110 to share the same service area, thereby reducing the number of service areas required and the corresponding total cost of support equipment. In cases where the ratio of the spectrum bandwidth to the symbol rate happens to be equal or very close to $2^n$, real codes are preferable to complex codes. At other ratios, however, complex codes may be used advantageously to increase the capacity of a code division multiple access communications system.

Figure 3:
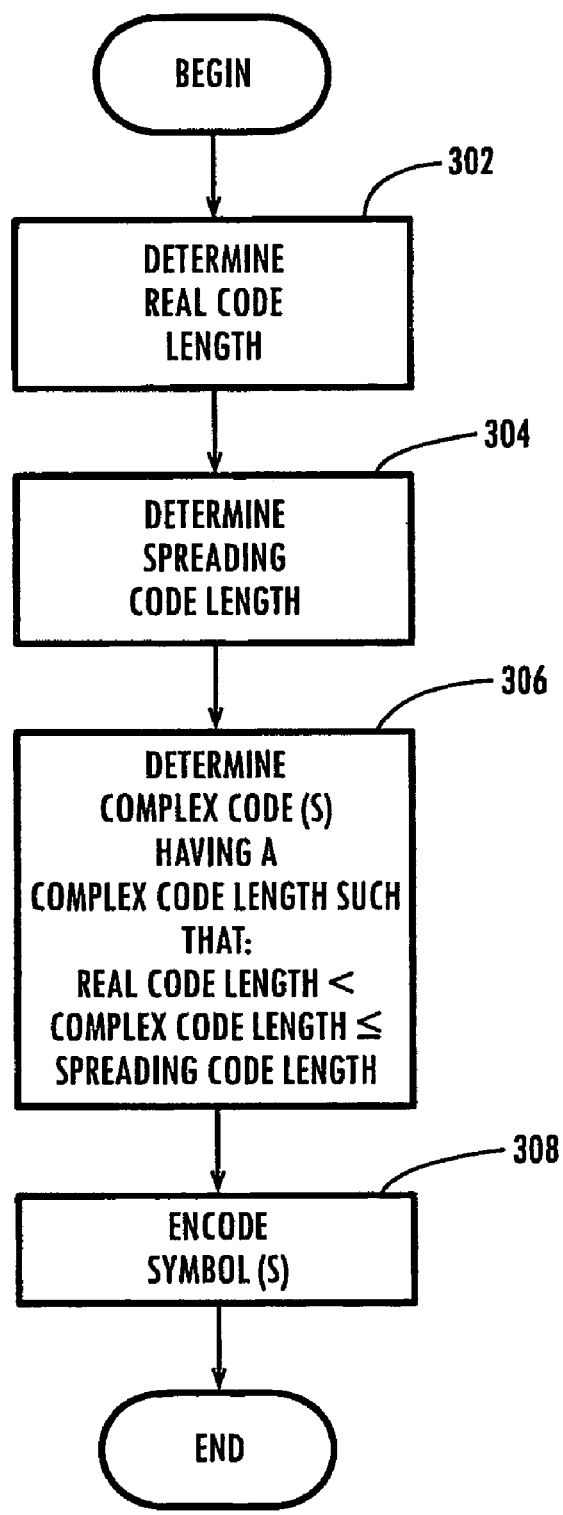
FIG. 3 is a flowchart of an approach for determining codes according to an embodiment of the present invention.

Referring now to FIG. 3, one example of an approach for determining codes for encoding a symbol is described. The codes determined by this approach are complex codes having a length that is greater than a real code length and less than or equal to a spreading code length.

At step 302, a real code length is determined. In one example, this may be a Walsh code having a length of $2^n$, where n is an integer. At step 304, a spreading code length is determined. In one approach, the spreading code length may be determined to be the maximum ratio of bandwidth to symbol code length.

At step 306, a complex code having a complex code length is determined. The complex code is selected such that its length is greater than the real code length (determined at step 302), but less than or equal to the spreading code length (determined at step 304). In one example, a set of complex codes having a length of 4n can be determined according to equations (1) and (2). It will be appreciated, however, that the codes generated according to equations (1) and (2) are examples only, and that other examples or formula may be used to determine the complex codes.

At step 308, a symbol is encoded using one of the complex codes created at step 306. For instance, referring again now to FIG. 1, symbols being sent along the user links 108 may be encoded using the codes determined at step 306. These complex codes have a length that is greater than the real code length and less than or equal to the spreading code length.

Other modifications, variations, and arrangements of the present invention may be made in accordance with the above teachings other than as specifically described to practice the invention within the spirit and scope of the following claims.

What is claimed is:

1. A method of optimizing utilization of user link bandwidth for a code division multiple access communications system comprising the steps of:
    selecting a set of orthogonal complex codes, an optimum real code, and a spreading code, each of the set of orthogonal complex codes, the optimum real code, and the spreading code being associated with each of the others and each of the set of orthogonal complex codes, the optimum real code, and the spreading code being related to a value n, the value n being an integer and being the same for each of the codes, the value n being related to a code length for each of the set of orthogonal complex codes, the optimum real code, and the spreading code;
    selecting a code length for the set of orthogonal complex codes that is greater than a code length of the associated optimum real code and less than or equal to a code length of the associated spreading code, the length of the set of orthogonal complex codes being chosen so that utilization of a bandwidth of at least one of a plurality of user links is optimized; and
    transferring symbols across the at least one of a plurality of user links to or from at least corresponding one of a plurality of user terminals wherein the symbols are represented by a corresponding one of the set of orthogonal complex codes.

2. The method of claim 1 wherein the set of orthogonal complex codes is generated from a Kronecker tensor product given by formula:

$$C_{L \times P} = A_L \otimes W_P$$

wherein
$C_{L \times P}$ is a matrix of orthogonal complex codes wherein each of the orthogonal complex codes has a code length equal to L×F,
L is a positive integer,
P equals $2^n$ where n equals a positive integer,
$W_P$ is a Walsh code matrix for a code length of P,
$A_L$ is a matrix of coefficients $a_{jk}$ wherein j is a row index equal to 1 ... L, k is a column index equal to 1 ... L, and $$a_{jk} = e^{j2\pi(j-1)(k-1)/L}.$$

3. The method of claim 1 wherein the corresponding one of the set of orthogonal complex codes has a code length of 12.

4. The method of claim 1 wherein the spreading code has a code length of 12.

5. A code division multiple access communications system comprising:
    a base station;
    a geo-stationary platform;
    a feeder link coupled to the base station and the geo-stationary platform that transfers symbols between the base station and the geo-stationary platform;
    a plurality of user terminals; and
    a plurality of user links coupled respectively to the plurality of user terminals and to the geo-stationary platform that transfers symbols between the geo-stationary platform and at least one of the plurality of user terminals wherein the symbols are represented by a corresponding one of a set of orthogonal complex codes having a code length that is greater than a code length of an optimum real code and less than or equal to a length of a spreading code, wherein each of the set of orthogonal complex codes, the optimum real code, and the spreading code is associated with each of the others and each of the set of orthogonal complex codes, the optimum real code, and the spreading code is related to a value n, the value n being an integer and being the same for each of the codes, the value n being related to a code length for each of the set of orthogonal complex codes, the optimum real code, and the spreading code.

6. The system of claim 5 wherein the set of orthogonal complex codes is generated from a Kronecker tensor product given by:

$$C_{L \times P} = A_L \otimes W_P$$

wherein
- $C_{L \times P}$ is a matrix of orthogonal complex codes wherein the at least one of the orthogonal complex codes has a code length equal to L×P,
- L is a positive integer,
- P equals $2^n$ and n equals a positive integer,
- $W_P$ is a Walsh code matrix for a code length of P,
- $A_L$ is a matrix of coefficients $a_{jk}$, where j is a row index equal to 1 . . . L, k is a column index equal to 1 . . . L, and $$a_{jk} = e^{j2\pi(j-1)(k-1)/L}.$$

7. The system of claim 5 wherein the at least one of the set of orthogonal complex codes has a code length of 12.

8. The system of claim 5 wherein the spreading code has a code length of 12.

9. A method of increasing utilization of user link bandwidth in a code division multiple access communications system comprising the steps of:
- selecting a spreading code length; and
- selecting a set of orthogonal complex codes each having a code length that is greater than a code length of an optimum real code and less than or equal to the length of a spreading code, wherein the spreading code, set of orthogonal complex codes, and optimum real codes are related to a value n, the value n being an integer and being the same for each of the codes, the value n being related to a code length for each of the set of orthogonal complex codes, the optimum real code, and the spreading code; and
- transferring the symbols across a user link to or from a user terminal wherein the symbols are represented by a corresponding one of the set of orthogonal complex codes.

* * * * *